Patented Jan. 23, 1934

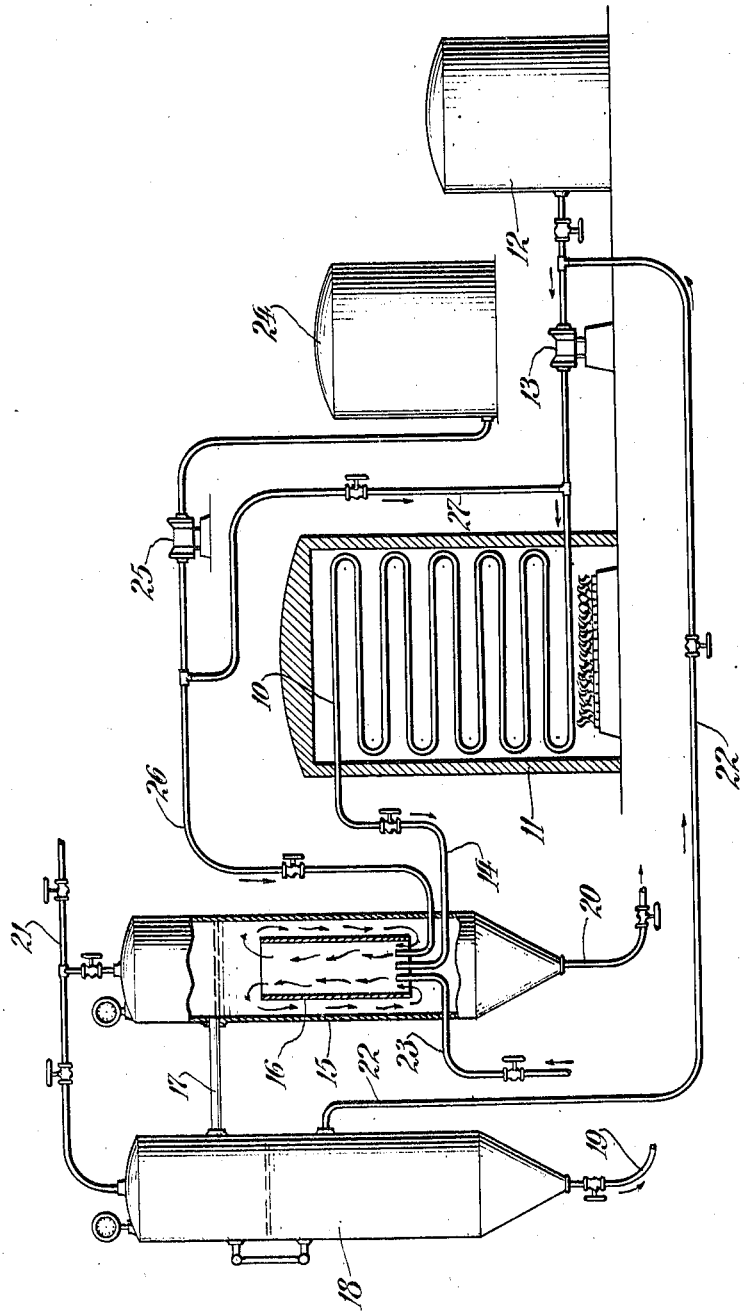

1,944,170

UNITED STATES PATENT OFFICE 1,944,170

PROCESS OF DESULPHURIZING, DECOLOR-
IZING, DEODORIZING, AND DEGUMMING
HYDROCARBONS, AND OF PROVIDING A
PROTECTIVE BUFFER FOR APPARATUS

Homer T. Darlington, West Chester, Pa., assignor, by mesne assignments, to Oil Corporation of America, a corporation of Delaware Application November 24, 1926, Serial No. 150,629. Renewed March 23, 1933

1 Claim. (Cl. 196—26)

My invention relates to new and useful methods of desulphurizing, decolorizing, deodorizing and degumming hydrocarbons and providing a buffer against the corrosive action of sulphur in hydrocarbons on apparatus and containers.

Heretofore copper, iron, nickel and lime have been used in the art to eliminate sulphur from hydrocarbon. I use these materials for that purpose in my process, but I use them in the form of oxides, hydrates or sulphates. I do not, however, limit myself to the oxides, hydrates and sulphates of these or other metals, but claim the right to use other materials known in the arts as efficient desulphurants which are capable of being dispersed in colloidal form in hydrocarbons, as hereinafter set forth. I have also found that if I treat silicates with acid and remove all or part of the soluble product of reaction, and incorporate the residue, either dry, or in solution with or dispersed or suspended in a non-oleaginous liquid, I obtain a new but very efficient agent for eliminating sulphur. These several materials for eliminating sulphur from hydrocarbons will be hereinafter referred to as desulphurizing agents.

These desulphurizing agents when used in the manner provided for in my process also act to remove objectionable coloring matter and thus in whole or in part decolorize the hydrocarbon or some of its fractions; and act to remove objectionable odors, and to lessen the gum said to be caused by diolefins produced in cracking. They also act as buffers to prevent or lessen the corrosive action of sulphur on the walls and other parts of the apparatus.

My discovery is a new and useful improvement in the manner of using these desulphurizing agents which is made possible by recent discoveries and improvements made by me in the art of colloid chemistry, whereby it is rendered possible for me to disperse or incorporate desulphurizing agents in colloidal form in hydrocarbon before and during cracking. By so doing, I am able to expose an amount of surface larger than has been exposed before in the art of desulphurizing in relation to the mass of desulphurizing agent used.

In the drawing, the figure shows a side elevation, partly in section, of a plant for treating hydrocarbon oil according to my invention.

The embodiment illustrated comprises a common form of pipe still having a coil 10 heated by means of a furnace 11 and supplied with oil to be treated from a tank 12 by means of a pump 13. The heated oil from the pipe still passes through a pipe 14 to a reaction chamber 15 having a central vertically disposed tubular portion 16 to which the hot oil from the still is delivered. Circulation occurs as indicated by the arrows.

Unvaporized oil from the reaction chamber 15 passes through a pipe 17 to a settling tank 18 from which settlings may be drawn off through a pipe 19. Some material can also be drawn off from the bottom of the reaction chamber 15 through a pipe 20. Vapors of lighter hydrocarbons pass off through a pipe 21 to suitable condensers (not shown). Residuum from the tank 18 is drawn off through a pipe 22 and returned to the pump 13 and thence back to the reaction chamber 15. Gas for agitating may be introduced through a pipe 23. Thus much of the apparatus is old in the art.

To this I have added a tank 24 for holding the desulphurizing and cracking agent which is in solution or suspension and which is supplied by means of a pump 25 through a pipe 26 direct to the reaction chamber 15 or through a pipe 27 to the heating coil. Suitable pressures are maintained by means of the valves shown.

I have found that when I so incorporate or disperse the colloidal desulphurizing agents in the manner set forth in my patent application, Serial No. 151,342, covering the dispersion or incorporation of materials in oil, that I may then conduct such a mixture into hydrocarbon containing no desulphurizing agent, and that the relatively enormous surface exposure of the discrete particles of the desulphurizing materials, and the stirring of the said mixture in such a manner as to bring about rapid contact between the dispersed particles of the agent and the hydrocarbon, enables me to accomplish quicker and more complete desulphurizing than by methods heretofore used.

The parts of apparatus used for the cracking of hydrocarbon and its accessories are corroded by the effects of sulphur in the hydrocarbon. This corrosion and effect is a combination of the sulphur or sulphur compounds or hydrocarbon products with the iron or other metals used in the apparatus. Certain forms of iron oxide or hydrate sold under the names of Bog iron ore, Lux ore, Red ore, Gas oxide, etc., heretofore used for removing sulphur from artificial gas, have also been used for the removal of a portion of sulphur from hydrocarbon containing sulphur before or during the process of treating or distillation, but in no case has an endeavor been made to employ a mixture with the major or efficient portion of the iron in an incorporated or dispersed form, as herein set forth.

I have newly discovered that a more efficient removal can be accomplished by raising the temperature of the hydrocarbon containing the iron oxide or hydrate or sulphate or other desulphurizing agent, in an incorporated or dispersed form and subjected to agitation, to a temperature between 600 and 900 degrees Fahrenheit, whereby, for example, the oxide, or hydrate or sulphate of iron, is converted into metallic iron of practically the same type and character as that used in the construction of the cracking apparatus.

By thus dispersing the iron oxide or hydrate, one ounce of material may have many times the surface area of the apparatus used, and therefore and thereby the amount of attack on the apparatus is modified and lessened in almost direct proportion to the amount of surface exposed by the particles of metallic iron held in a dispersed, incorporated or suspended condition and reduced in situ from the iron oxide or hydrate which has been incorporated or dispersed in oil added to the apparatus and raised to the reduction point in temperature. The surface of the dispersed or suspended metallic iron, produced in situ, being attacked by the sulphur eliminates such attack to that extend from the apparatus used in cracking. In more simple words, metallic iron in a finely divided form with great surface is furnished as a buffer to be attacked instead of the still.

I have also found that metals added in any of the forms named to hydrocarbons in finely divided particles more quickly absorb heat and reach a higher temperature, and as a consequence more quickly and more efficiently desulphurize hydrocarbons than when in larger particles.

Without interference with its action in eliminating carbon and serving as a buffer as aforesaid, the desulphurization agent separates out part of the hydrocarbon gummy matter, which is very objectionable when it remains in the finished products, and takes out in part those sulphur compounds, nitrogen bases, naphthenic acids and other constituents which give products of cracking foul or unpleasant odors, thus causing the finished products gasoline and other distillates to contain less gum and to have a less objectionable odor.

In describing the method of operation reference has been made to oxide of iron as the desulphurizing agent, but the other desulphurizing agents referred to above, when used in our process, will effectuate similar results though in some cases the scientific causes of their doing so and the explanation of how they perform the work would differ.

The action described and the attaining of the desired object are not hindered or prevented by the presence with the finely divided desulphurizing agent, of the same agent in a granular form, while the presence of the granular particles makes easier the settling out of the desulphurizing agent with its load of sulphur and other objectionable matter when it is desired to remove them.

I claim:

The process of desulphurizing hydrocarbon oil which consists in subjecting a mass of liquid hydrocarbon oil to cracking conditions within an apparatus, the walls of which are subject to the corrosive effects of sulphur, and of incorporating throughout the mass of liquid hydrocarbon oil finely divided particles of metallic iron in a colloidal state of subdivision produced in situ from oxide of iron dispersed and incorporated throughout the mass of liquid hydrocarbon oil and forming points for the sulphur to react upon.

HOMER T. DARLINGTON.